US008873636B2

(12) United States Patent
Iwasaki

(10) Patent No.: US 8,873,636 B2
(45) Date of Patent: Oct. 28, 2014

(54) MOVING IMAGE DISTRIBUTION SERVER, MOVING IMAGE REPRODUCTION APPARATUS, CONTROL METHOD, PROGRAM, AND RECORDING MEDIUM

(75) Inventor: Tetsuji Iwasaki, Quebec (CA)

(73) Assignee: Square Enix Holdings Co., Ltd., Tokyo (JP)

( * ) Notice: Subject to any disclaimer, the term of this patent is extended or adjusted under 35 U.S.C. 154(b) by 100 days.

(21) Appl. No.: 13/817,171

(22) PCT Filed: Jun. 27, 2012

(86) PCT No.: PCT/JP2012/067026
§ 371 (c)(1),
(2), (4) Date: Feb. 15, 2013

(87) PCT Pub. No.: WO2013/024640
PCT Pub. Date: Feb. 21, 2013

(65) Prior Publication Data
US 2013/0263199 A1 Oct. 3, 2013

Related U.S. Application Data

(60) Provisional application No. 61/524,460, filed on Aug. 17, 2011.

(30) Foreign Application Priority Data

Jan. 31, 2012 (JP) ................. 2012-019239

(51) Int. Cl.
*H04N 7/12* (2006.01)
*H04N 21/654* (2011.01)

(52) U.S. Cl.
CPC .............. *H04N 21/654* (2013.01); *A63F 13/12* (2013.01); *A63F 13/00* (2013.01); *H04N 19/00278* (2013.01); *A63F 2300/807* (2013.01); *G06T 9/00* (2013.01); *A63F 2300/6684* (2013.01); *A63F 2300/538* (2013.01); *H04N 7/50* (2013.01); *H04N 19/0003* (2013.01); *A63F 2300/6676* (2013.01); *H04N 19/00769* (2013.01)
USPC ................................... 375/240.24

(58) Field of Classification Search
CPC ....................................... H04N 7/50
USPC .................................. 375/240.24
See application file for complete search history.

(56) References Cited

U.S. PATENT DOCUMENTS 5,742,289 A 4/1998 Naylor et al.
6,741,259 B2 * 5/2004 Baker et al. ................... 345/582
(Continued)

FOREIGN PATENT DOCUMENTS

EP 1364535 11/2003
EP 1641278 3/2006
(Continued)

OTHER PUBLICATIONS

International Search Report and Written Opinion in International Application No. PCT/JP2012/067026, dated Sep. 18, 2012.
(Continued)

*Primary Examiner* — Sath V Perungavoor
*Assistant Examiner* — James Pontius
(74) *Attorney, Agent, or Firm* — Greenblum & Bernstein, P.L.C.

(57) ABSTRACT

A moving image distribution server selects an intermediate value map of at least one channel during execution of a rendering processing of a subsequent stage for a first screen, and determines, for each set block, whether to perform inter-frame coding by referring to a corresponding intermediate value map generated for a second screen rendered before the first screen. The moving image distribution server performs coding in accordance with the determination result and sends coded moving image data to an external device after the rendering processing of the subsequent stage for the first screen has ended. The determination result is sent to the external device before generation of the coded moving image data of the first screen is completed.

6 Claims, 9 Drawing Sheets

(51) Int. Cl.
*A63F 13/30* (2014.01)
*A63F 13/00* (2014.01)
*H04N 19/176* (2014.01)
*G06T 9/00* (2006.01)
*H04N 19/61* (2014.01)
*H04N 19/107* (2014.01)
*H04N 19/597* (2014.01)

(56) References Cited

U.S. PATENT DOCUMENTS

| | | | |
|---|---|---|---|
| 6,868,191 B2 * | 3/2005 | Nister | 382/285 |
| 6,975,329 B2 * | 12/2005 | Bastos et al. | 345/587 |
| 7,558,428 B2 | 7/2009 | Shen et al. | |
| 7,813,570 B2 | 10/2010 | Shen et al. | |
| 7,894,525 B2 | 2/2011 | Piehl et al. | |
| 8,154,553 B2 | 4/2012 | Peterfreund | |
| 8,264,493 B2 | 9/2012 | Peterfreund | |
| 8,447,141 B2 * | 5/2013 | Barenbrug | 382/298 |
| 8,599,403 B2 * | 12/2013 | Redert et al. | 358/1.15 |
| 2004/0012600 A1 * | 1/2004 | Deering et al. | 345/506 |
| 2004/0095999 A1 | 5/2004 | Piehl et al. | |
| 2005/0237323 A1 | 10/2005 | Shimamura et al. | |
| 2006/0056513 A1 | 3/2006 | Shen et al. | |
| 2006/0056708 A1 | 3/2006 | Shen et al. | |
| 2009/0027383 A1 * | 1/2009 | Bakalash et al. | 345/419 |
| 2009/0278842 A1 | 11/2009 | Peterfreund | |
| 2009/0289945 A1 | 11/2009 | Peterfreund | |
| 2010/0302078 A1 * | 12/2010 | Schuessler | 341/90 |
| 2011/0069139 A1 | 3/2011 | Liu | |
| 2011/0216833 A1 * | 9/2011 | Chen et al. | 375/240.16 |
| 2012/0229602 A1 * | 9/2012 | Chen et al. | 348/43 |
| 2012/0299938 A1 | 11/2012 | Iwasaki | |
| 2013/0017889 A1 | 1/2013 | Kozlov | |
| 2013/0335523 A1 | 12/2013 | Iwasaki | |

FOREIGN PATENT DOCUMENTS

| | | |
|---|---|---|
| JP | 7-327231 | 12/1995 |
| JP | 8-305895 | 11/1996 |
| JP | 3287977 | 3/2002 |
| JP | 2002-369205 | 12/2002 |
| JP | 2004-517590 | 6/2004 |
| JP | 2006-094494 | 4/2006 |
| JP | 4004408 | 8/2007 |
| JP | 2007-251543 | 9/2007 |
| JP | 2008-048178 | 2/2008 |
| JP | 2008-252651 | 10/2008 |
| WO | 02/060183 | 8/2002 |
| WO | 2009/138878 | 11/2009 |

OTHER PUBLICATIONS

U.S. Appl. No. 13/938,612 to Tetsuji Iwasaki, filed Jul. 10, 2013.

* cited by examiner

F I G. 8
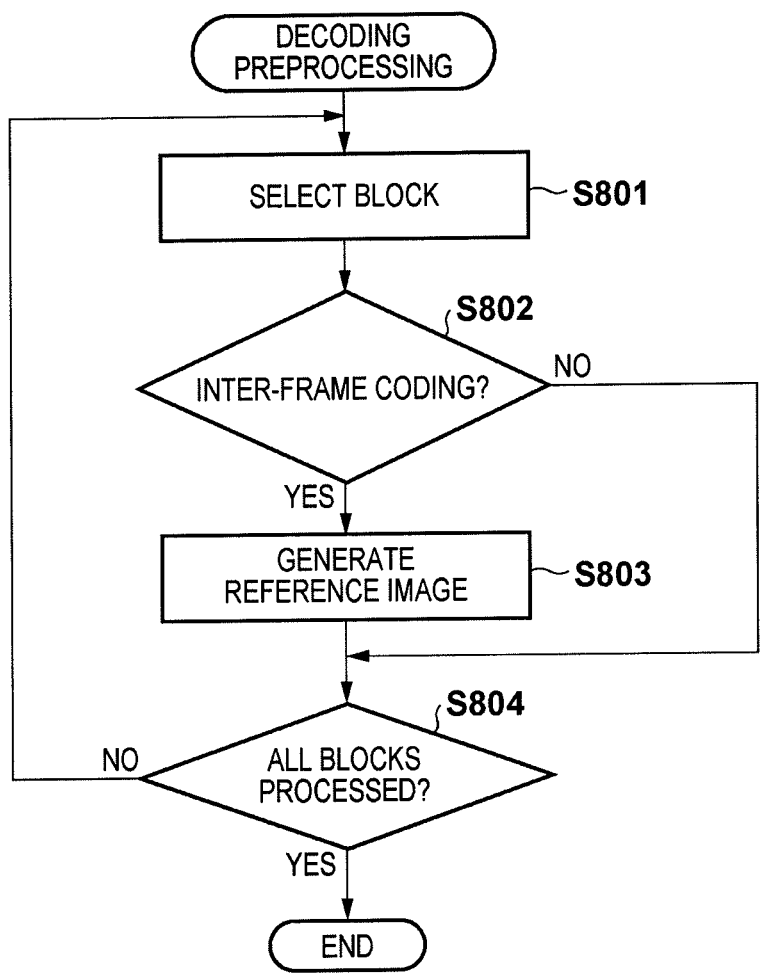

F I G. 11
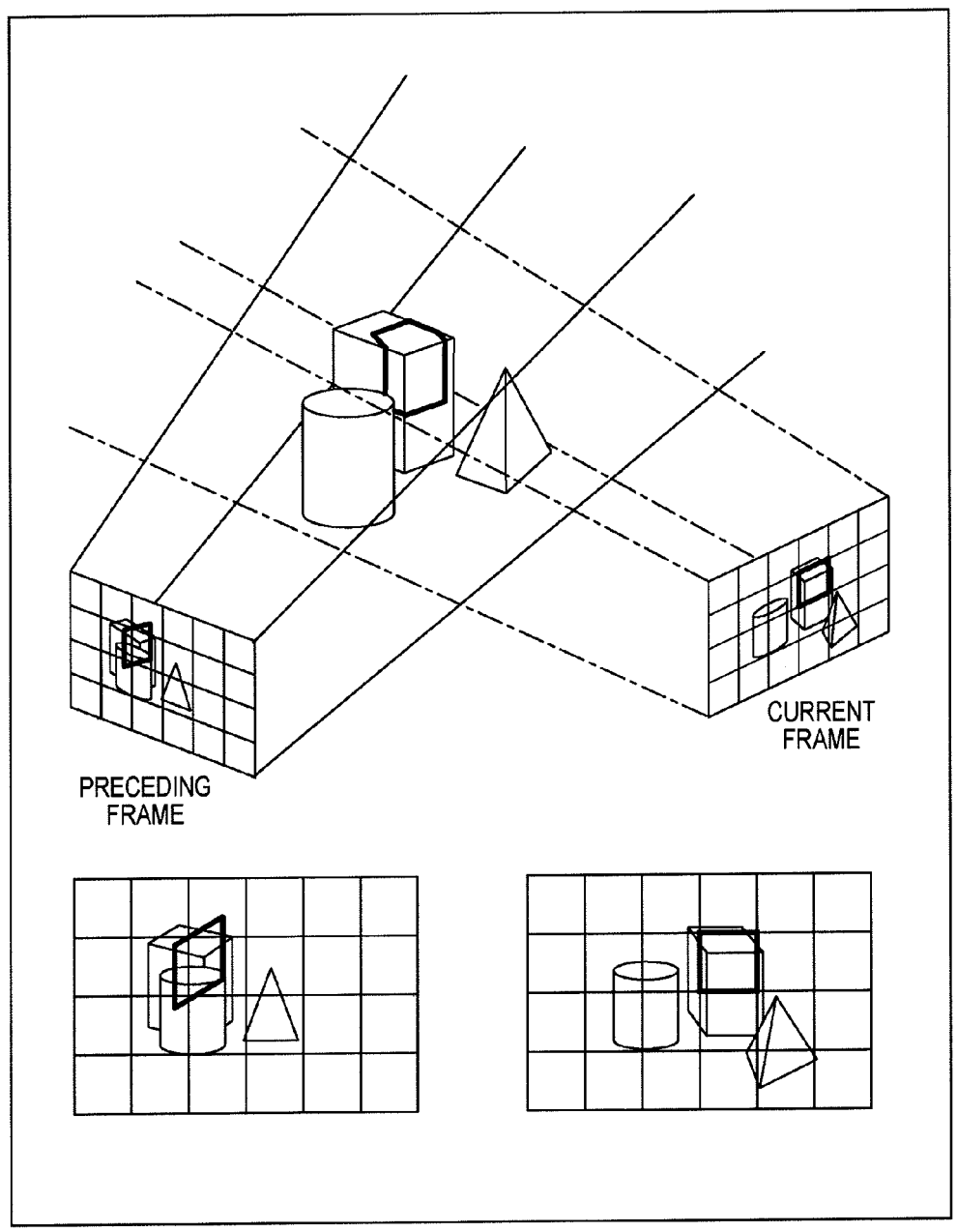

MOVING IMAGE DISTRIBUTION SERVER, MOVING IMAGE REPRODUCTION APPARATUS, CONTROL METHOD, PROGRAM, AND RECORDING MEDIUM

TECHNICAL FIELD

The present invention relates to a moving image distribution server, a moving image reproduction apparatus, a control method, a program, and a recording medium and, more particularly, to a coded moving image data streaming distribution technique.

BACKGROUND ART

Client devices such as personal computers (PCs) capable of network connection have become widespread. Along with the widespread use of the devices, the network population of the Internet is increasing. Various services using the Internet have recently been developed for the network users, and there are also provided entertainment services such as games.

One of the services for the network users is a multiuser online network game such as MMORPG (Massively Multi-player Online Role-Playing Game). In the multiuser online network game, a user connects his/her client device in use to a server that provides the game, thereby doing match-up play or team play with another user who uses another client device connected to the server.

In a general multiuser online network game, each client device sends/receives data necessary for game rendering to/from the server. The client device executes rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to execute rendering processing require a user to use a PC having sufficient rendering performance or a dedicated game machine. For this reason, the number of users of a network game (one content) depends on the performance of the client device required by the content. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability such as rendering performance of a client device. In a game as described in International Publication No. 2009/138878, a server acquires the information of an operation caused in a client device and provides, to the client device, a game screen obtained by executing rendering processing using the information.

In the above-described game of International Publication No. 2009/138878, the game screen provided by the server to the client device is provided in the form of coded moving image data to reduce the information amount to be sent. A general moving image coding type such as an MPEG standard performs intra coding (intra-frame coding) without motion compensation for each block obtained by dividing one frame image or inter coding (inter-frame coding) with motion compensation by inter-frame prediction, although this changes depending on the adopted coding type. For each coding type, an object of high compression efficiency exists. In general, blocks (iblock and pblock) are generated by performing intra coding and inter coding for each block, and a block of high compression efficiency is included in coded data.

In intra coding, DCT, run-length coding, and the like are applied to an unprocessed block image of compression target, thereby compressing the image. On the other hand, in inter coding, the difference image between a block image of compression target and a reference image extracted from the preceding frame image in correspondence with the block is generated. Then, DCT, run-length coding, and the like are applied to the image to compress it. For this reason, inter coding includes processing of specifying, in the preceding frame image, a region having the highest correlation to the compression target block image. In the processing associated with detection of the region having the highest correlation, analysis is performed by calculating the similarity and distance to the compression target block image while moving the evaluation region in the preceding frame image. Hence, this analysis processing may take time.

Especially in, for example, a game that changes the rendered contents interactively based on user input, real-time rendering, that is, high-speed response to input is needed, and the time required for moving image coding processing is limited. In this case, it is necessary to quickly perform coding processing of each block and processing of determining whether to perform intra coding or inter coding. However, no detailed method of quickly and efficiently performing moving image coding of a rendered screen has been disclosed yet.

SUMMARY OF INVENTION

The present invention has been made in consideration of the above-described problems of the prior art. The present invention provides a moving image distribution server for quickly and efficiently performing moving image coding of a screen obtained by rendering processing, a moving image reproduction apparatus, a control method, a program, and a recording medium.

The present invention in its first aspect provides a moving image distribution server comprising: acquisition means for sequentially acquiring viewpoint information to determine a screen to be rendered; rendering means for rendering a distribution screen by rendering processing in at least two steps using the viewpoint information acquired by the acquisition means, wherein the rendering means generates, in rendering processing of a preceding stage, an intermediate value map of a specific channel to be referred to in rendering processing of a subsequent stage, and renders, in the rendering processing of the subsequent stage, the distribution screen by referring to the intermediate value map; division means for acquiring an intermediate value map of at least one channel generated for a first screen and dividing the intermediate value map into a plurality of blocks during execution of the rendering processing of the subsequent stage for the first screen; specifying means for specifying, for each of the plurality of blocks, a region corresponding to the block on the intermediate value map of the same channel generated for a second screen rendered before the first screen; coding means for generating, after an end of the rendering processing of the subsequent stage for the first screen, coded moving image data by coding the first screen, wherein for a block, out of the plurality of blocks, whose similarity to the corresponding region specified by the specifying means is not less than a threshold, the coding means performs inter-frame coding between an image of the block of the first screen and an image of the corresponding region of the second screen, and for a block, out of the plurality of blocks, whose similarity to the corresponding region specified by the specifying means is less than the threshold, the coding means performs intra-frame coding of the image of the block of the first screen; and sending means for sending data to an external device, wherein the sending means sends, for the block whose similarity to the corresponding region is not less than the threshold, the block and specific information to specify the corresponding region for the block to the external device before the coding means completes generation of the coded moving image data of each block of the first screen, and sends the coded moving image data to the external device after the coding means has completed generation of the coded moving image data of each block of the first screen.

Further features of the present invention will become apparent from the following description of exemplary embodiments (with reference to the attached drawings).

BRIEF DESCRIPTION OF DRAWINGS

FIG. 8 is a flowchart illustrating decoding preprocessing of the PC 100 according to the embodiment of the present invention;

FIG. 11 is a view for explaining a method of estimating a region supposed to have the highest correlation according to a modification of the present invention.

DESCRIPTION OF EMBODIMENTS

An exemplary embodiment of the present invention will now be described in detail with reference to the accompanying drawings. Note that in the following embodiment, an example of a moving image distribution system will be explained in which the present invention is applied to a PC 100 serving as a moving image reproduction apparatus and a moving image distribution server 200.

<Arrangement of Moving Image Distribution System>

Figure 1:
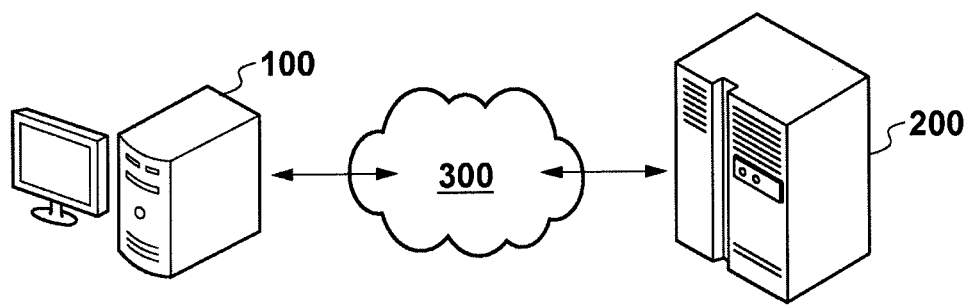
FIG. 1 is a view showing the system arrangement of a moving image distribution system according to the embodiment of the present invention.

FIG. 1 is a view showing the system arrangement of a moving image distribution system according to the embodiment of the present invention.

As shown in FIG. 1, the PC 100 and the moving image distribution server 200 are connected via a network 300 such as the Internet. In this embodiment, the PC 100 receives, as coded moving image data, a game screen of a game content executed in the moving image distribution server 200 as an example of a moving image distribution content. In this embodiment, the moving image distribution server 200 receives an operation (user input) caused in the PC 100 and renders a game screen corresponding to the operation on the frame basis. The moving image distribution server 200 then codes the rendered game screen and distributes the obtained coded moving image data to the PC 100. Upon receiving the coded moving image data from the moving image distribution server 200, the PC 100 decodes and reproduces the coded moving image data, thereby providing the game screen to the user.

In this embodiment, a content that provides a game screen rendered by a game program executed in the moving image distribution server 200 on the network 300 will be described as an example of a moving image distribution content. However, the practice of the present invention is not limited to this. The moving image distribution server 200 need only be configured to perform rendering processing to render one frame of a moving image distribution content to be provided to the distribution destination and distribute coded moving image data obtained by coding processing performed for each frame. Rendering of a screen of one frame need not always be executed in the moving image distribution server 200 and may be executed by, for example, an external rendering server.

In this embodiment, the PC 100 will be described as a client device connected to the moving image distribution server 200. However, the practice of the present invention is not limited to this. The client device connected to the moving image distribution server 200 can be any other device capable of decoding and reproducing coded moving image data received from the moving image distribution server 200, for example, a consumer game machine, a portable game machine, a cellular phone, a PDA, or a tablet.

<Arrangement of PC 100>

Figure 2:
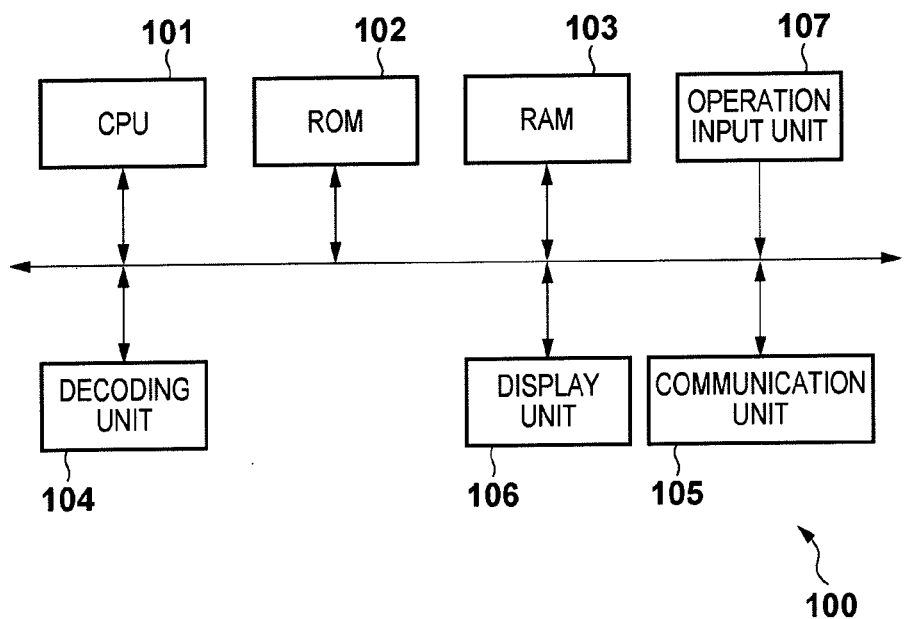
FIG. 2 is a block diagram showing the functional arrangement of a PC 100 according to the embodiment of the present invention.

FIG. 2 is a block diagram showing the functional arrangement of the PC 100 according to the embodiment of the present invention.

A CPU 101 controls the operation of each block of the PC 100. More specifically, the CPU 101 controls the operation of each block by reading out an operation program of moving image reproduction processing recorded in, for example, a ROM 102 or a recording medium, and extracting and executing the program on a RAM 103.

The ROM 102 is, for example, a rewritable nonvolatile memory. The ROM 102 stores the information of constants and the like necessary for the operation of each block of the PC 100 in addition to operation programs of moving image reproduction processing and the like.

The RAM 103 is a volatile memory. The RAM 103 serves as not only an operation program extraction area but also a storage area for temporarily storing intermediate data and the like output in the operation of each block of the PC 100.

A decoding unit 104 performs decoding processing of coded moving image data received by a communication unit 105 to be described later so as to generate a game screen of one frame. Before the decoding processing of coded moving image data, the decoding unit 104 performs decoding preprocessing of preparing reference data to be used in the decoding processing. The decoding preprocessing and decoding processing executed by the decoding unit 104 will be explained in detail concerning moving image reproduction processing to be described later.

The communication unit 105 is a communication interface provided in the PC 100. The communication unit 105 sends/receives data to/from another device such as the moving image distribution server 200 connected via the network 300. At the time of data sending, the communication unit 105 converts data into a data transmission format predetermined for the network 300 or the device of the sending destination and sends the data to the device of the sending destination. At the time of data reception, the communication unit 105 converts the data received via the network 300 into an arbitrary data format readable by the PC 100 and stores the data in, for example, the RAM 103.

In this embodiment, the description will be made assuming that the PC 100 and the moving image distribution server 200 are connected via the network 300. However, the PC 100 and the moving image distribution server 200 may, for example, directly be connected using a cable, as can easily be understood.

A display unit 106 is a display device such as an LCD monitor connected to the PC 100. The display unit 106 performs display control to display a received game screen in a display region. Note that the display unit 106 can be either a display device incorporated in the PC 100 such as a laptop PC or a display device externally connected to the PC 100 using a cable.

An operation input unit 107 is a user interface such as a mouse, a keyboard, or a game pad provided on the PC 100. Upon detecting that an operation of the user interface has been caused, the operation input unit 107 outputs a control signal corresponding to the operation to the CPU 101.

<Arrangement of Moving Image Distribution Server 200>

Figure 3:
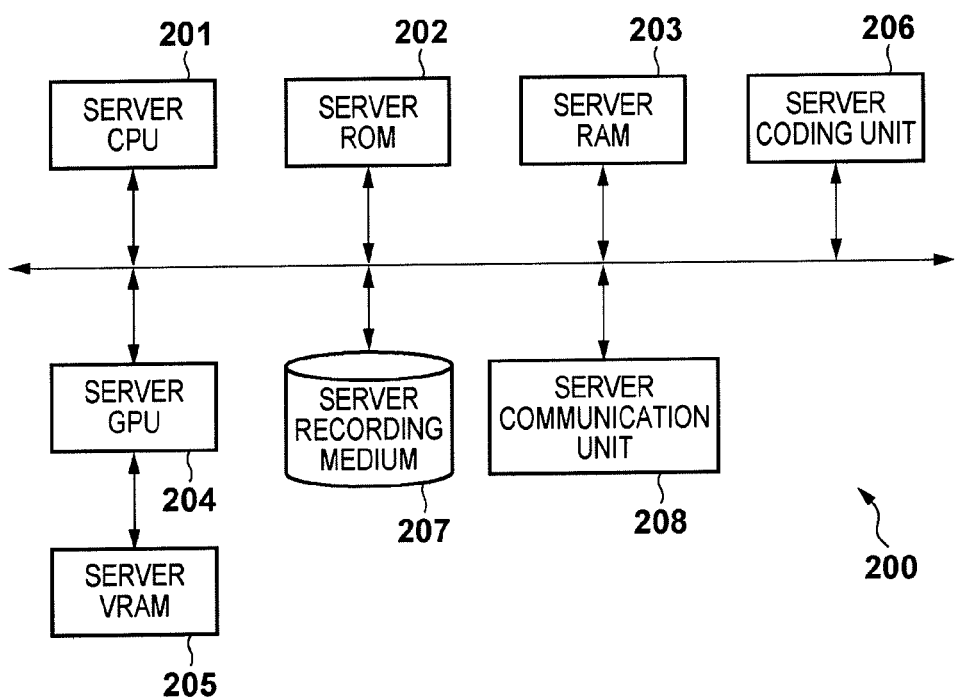
FIG. 3 is a block diagram showing the functional arrangement of a moving image distribution server 200 according to the embodiment of the present invention.

FIG. 3 is a block diagram showing the functional arrangement of the moving image distribution server 200 according to the embodiment of the present invention.

A server CPU 201 controls the operation of each block of the moving image distribution server 200. More specifically, the server CPU 201 controls the operation of each block by reading out an operation program of moving image distribution processing recorded in, for example, a server ROM 202, and extracting and executing the program on a server RAM 203.

The server ROM 202 is, for example, a rewritable nonvolatile memory. The server ROM 202 stores the information of constants and the like necessary for the operation of each block of the moving image distribution server 200 in addition to operation programs of moving image distribution processing and the like.

The server RAM 203 is a volatile memory. The server RAM 203 serves as not only an operation program extraction area but also a storage area for temporarily storing intermediate data and the like output in the operation of each block of the moving image distribution server 200.

A server GPU 204 generates a game screen to be displayed on the display unit 106 of the PC 100. A server VRAM 205 is connected to the server GPU 204. Upon receiving a rendering instruction and the information (viewpoint information) of the position and direction of a camera to be used for rendering of a game screen from the server CPU 201, the server GPU 204 reads out a rendering object concerning the rendering instruction from, for example, a server recording medium 207 to be described later and stores it in a GPU memory. When rendering on the connected server VRAM 205, the server GPU 204 extracts the rendering object to the cache memory and then writes the extracted rendering object in the server VRAM 205.

Note that in rendering processing of generating a game screen, the server GPU 204 of this embodiment uses a so-called Deferred Rendering method.

In a conventional rendering method, each rendering object included in a game screen is sequentially selected and rendered by performing the following processings:

1. movement/rotation processing by a vertex shader;
2. vertex processing by a geometry shader; and
3. effect processing including pixel-basis shadow processing by a pixel shader.

That is, the conventional rendering method is so-called Forward Rendering method performing a procedure "shadow processing→rendering" for each rendering object. In Forward Rendering, objects are sequentially processed. Hence, the rendered contents of one object may be overwritten by those of another object located closer to the camera (located nearer than the object of interest) depending on the pixels. In this case, the shadow processing is wastefully applied for a partial region of the object rendered first, which is occluded by the object rendered later. In addition, for example, a light source existing in a rendered scene is common to all objects existing in the scene. In Forward Rendering, however, it is difficult to reuse common calculation contents for rendering one object to render another object. For these reasons, the Forward Rendering is not efficient in game screen rendering with particularly complex shadow processing.

On the other hand, in Deferred Rendering, geometry to be used for shadow processing is calculated first, and shadow processing of all rendering objects is performed later at once, unlike the Forward Rendering. That is, the rendering processing is executed in two steps including a procedure "geometry rendering→shadow processing→rendering". In the Deferred Rendering, the geometry is rendered together with parameters to be used for shadow processing without lighting in rendering of the preceding stage, thereby generating a plurality of intermediate value maps (Albedo map, Depth map, Normal map, Specular map, Diffuse map, and the like) representing the intermediate values to be used for the shadow processing. In rendering of the subsequent stage, a screen is rendered by performing shadow processing using a light source while applying the plurality of generated intermediate value maps.

A server coding unit 206 performs coding processing of the game screen generated on the server VRAM 205 by the server GPU 204. The server coding unit 206 divides the game screen of the coding target into blocks and performs intra coding (intra-frame coding) or inter coding (inter-frame coding) of each block. Details of the coding processing will be described later. In this embodiment, the server coding unit 206 performs DCT (Discrete Cosine Transform) of each block for each color channel of YCbCr and then compresses each block by run-length coding. In this embodiment, the description will be made assuming that the server coding unit 206 exists as a single block for performing the coding processing of the game screen. However, the coding processing may be executed by the server GPU 204.

The server recording medium 207 is a recording device such as an HDD detachably connected to the moving image distribution server 200. In this embodiment, the server recording medium 207 is assumed to record the data of each rendering object, the information of a light source arranged in a three-dimensional scene expressed on the screen, and the like, which are used in screen rendering processing.

A server communication unit 208 is a communication interface provided in the moving image distribution server 200. In this embodiment, the server communication unit 208 sends/receives data to/from another device such as the PC 100 connected via the network 300. Note that the server communication unit 208 performs data format conversion based on the communication specification, like the communication unit 105.

<Moving Image Distribution Processing>

Figure 4:
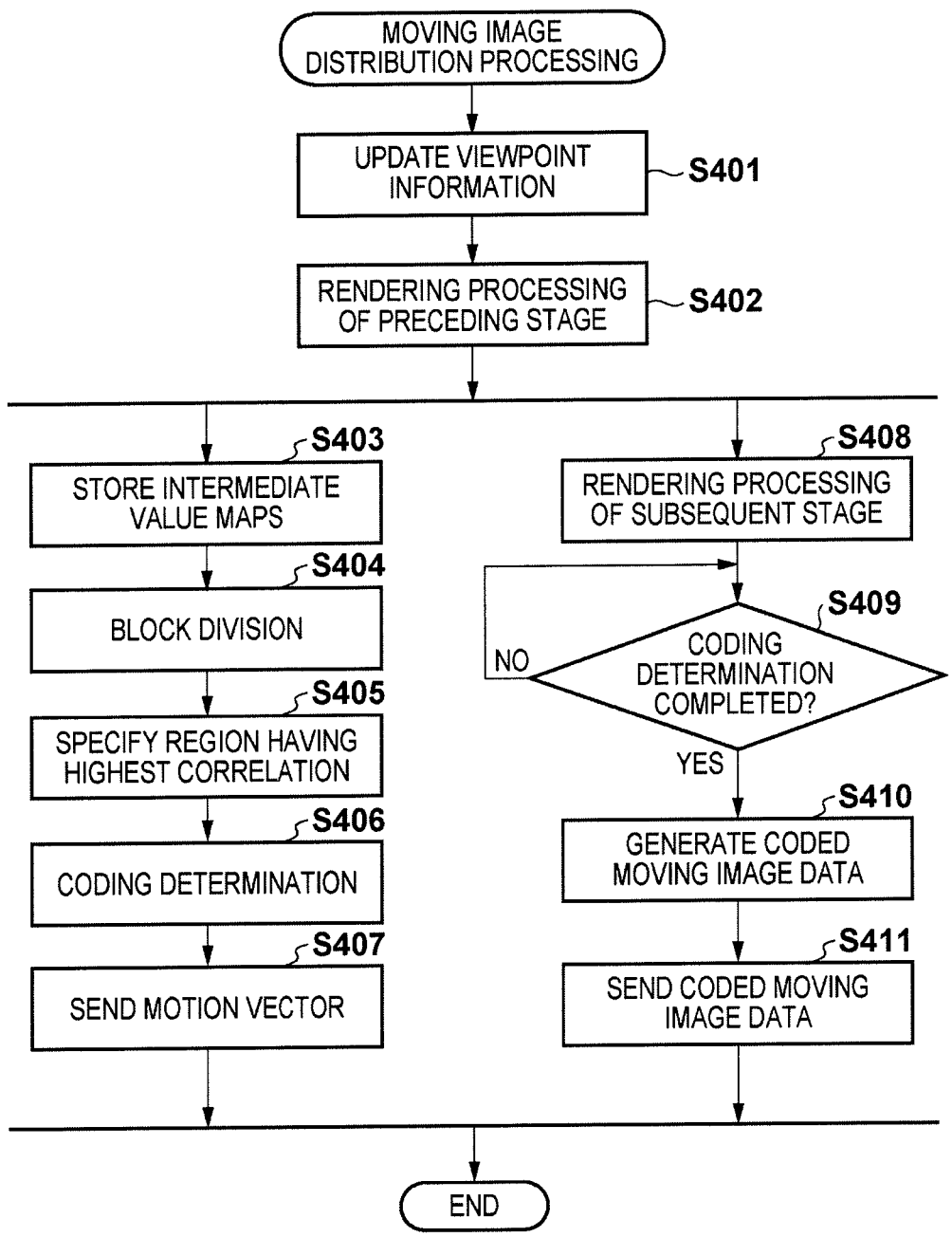
FIG. 4 is a flowchart illustrating moving image distribution processing of the moving image distribution server 200 according to the embodiment of the present invention.

Detailed moving image distribution processing to be executed by the moving image distribution server 200 of the moving image distribution system according to the embodiment having the above-described arrangement will be described with reference to the flowchart of FIG. 4. Processing corresponding to the flowchart can be implemented by causing the server CPU 201 to read out a corresponding processing program recorded in, for example, the server ROM 202 and extract and execute it on the server RAM 203. Note that the description will be made assuming that the moving image distribution processing is started when the server CPU 201 detects that a distribution request for a game content provided by the moving image distribution server 200 has been received from the PC 100, and repetitively executed for each frame of the game.

Note that in this embodiment, the description will be made assuming that the moving image distribution server 200 provides, to the PC 100, a game screen generated by rendering a three-dimensional scene using the Deferred Rendering method in a form of coded moving image data. However, the content to be distributed by the moving image distribution server 200 is not limited to this, as described above, and can be any arbitrary content for providing a screen obtained by rendering a three-dimensional scene in at least two steps.

In step S401, the server CPU 201 updates the viewpoint information of a game screen to be rendered next. More specifically, the server CPU 201 updates the viewpoint information of a game screen to be rendered next by, for example, referring to the information of an operation input concerning the game caused by the user on the PC 100, which is received by the server communication unit 208. The user operation that may cause update of the viewpoint information corresponds to, for example, a viewpoint position/direction change operation or movement of a character that is the operation target of the user. Note that the viewpoint information to be used for rendering the game screen may be changed not only by a user operation caused on the PC 100 but also in accordance with, for example, the progress of the game.

Figure 5:
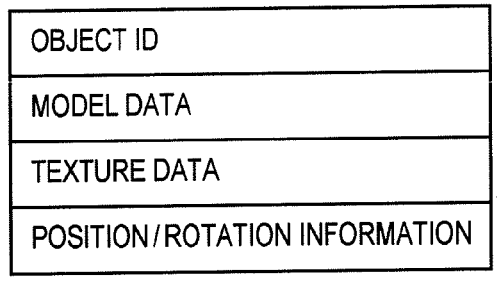
FIG. 5 is a view illustrating the data structure of a rendering object according to the embodiment of the present invention.

In step S402, the server CPU 201 causes the server GPU 204 to execute rendering processing of the preceding stage for the game screen corresponding to the viewpoint information updated in step S401, thereby generating various kinds of intermediate value maps to be used in rendering processing of the subsequent stage. More specifically, the server CPU 201 specifies rendering objects included in the game screen to be rendered and transmits the data of each rendering object to the server GPU 204 in accordance with the rendering order. The server GPU 204 stores the transferred data of the rendering objects in the GPU memory. The data of each rendering object has a structure as shown in, for example, FIG. 5. In this embodiment, each data contains model data (or vertex data and connection data), texture data, and position/rotation information in association with an object ID. Note that the texture data contains not only a general image texture (decal texture) applied (pasted) to a three-dimensional model to express its pattern and the like but also various kinds of maps to be used for shadow processing or material expression of the three-dimensional model.

The server GPU 204 moves and rotates the model data stored in the GPU memory based on the parameters of the position/rotation information of a rendering object to be rendered by a rendering instruction. After that, the server GPU 204 renders the object on the server VRAM 205 without applying light source effects (shadow processing and shading). At this time, a plurality of types of intermediate value maps corresponding to the game screen to be finally provided to the PC 100 are generated on the server VRAM 205. The plurality of types of intermediate value maps are referred to in shadow processing included in rendering processing of the subsequent stage to be described later, and in this embodiment, include at least Albedo map
Depth map
Normal map
Specular map
Diffuse map Note that the intermediate value maps except the Depth map are generated by converting, based on the viewpoint information of the game screen to be rendered, the information of each polygon of corresponding to texture data or model data contained in the data of all rendering objects included in the game screen to be rendered. That is, in Forward Rendering, shadow processing is executed for each rendering object in consideration its texture data, in contrast, in rendering processing of the preceding stage of Deferred Rendering, intermediate value maps are generated by regarding the entire game screen to be rendered as one rendering object. Whereby, this allows to perform shadow processing for the entire game screen in rendering processing of the subsequent stage so as to reduce repetitive calculations.

Note that the Depth map is generated by the conventional method in consideration of occlusion of each pixel by the preceding or subsequent rendering object when rendering each rendering object upon intermediate value map generation.

When rendering processing of the preceding stage is thus completed, the server CPU 201 executes processing of steps S403 to S407 and processing of steps S408 to S411 in parallel.

In step S403, the server CPU 201 stores the intermediate value maps in the server RAM 203 in association with a frame ID for identifying the rendering frame (current frame). For each frame of coded moving image data to be provided to the PC 100, the moving image distribution server 200 of this embodiment stores the intermediate value maps used for generating the rendered game screen in the server RAM 203 and holds them until at least coding processing of the next frame is completed.

In step S404, the server CPU 201 selects at least one of the plurality of types of intermediate value maps for coding determination, and divides the intermediate value map for coding determination (determination intermediate value map) into blocks each having a predetermined number of pixels (for example, 16 pixels×16 pixels). As described above, each intermediate value map corresponds to the game screen to be finally provided to the PC 100 and is usable to determine whether to perform inter-frame prediction in moving image coding of each block of the game screen to be provided.

In this embodiment, at least one of the Albedo map, the Depth map, the Specular map, and the Diffuse map is selected as the determination intermediate value map. Note that out of the generated intermediate value maps the Normal map can also be used for coding determination in principle. However, this map represents the normal direction by the pixel values. For this reason, if a rendering object includes a surface that is, for example, not uneven but patterned, all pixels of the surface have the same value. Hence, when coding determination to be described later is performed using only the Normal map, preferable data compression is not necessarily implemented. Hence, in this embodiment, out of the plurality of types of intermediate value maps generated by rendering processing of the preceding stage, maps other than the Normal map are used for coding determination.

In step S405, for each block of the determination intermediate value map, the server CPU 201 specifies a region having the highest correlation in a corresponding intermediate value map generated in rendering processing of the preceding stage for the game screen of the frame (preceding frame) immediately before the current frame. More specifically, the server CPU 201 reads out, out of the intermediate value maps generated by rendering processing of the preceding stage for the game screen of the preceding frame, a map (determination past intermediate value map) corresponding to (of the same type as) the map selected as the determination intermediate value map in step S404 from the server RAM 203. Then, the server CPU 201 searches the determination past intermediate value map for a region having the highest correlation for each block.

At this time, the server CPU 201 sets the image of the block to be subjected to coding determination as a reference image, sets a determination target region having as many pixels as the reference image from the determination past intermediate value map, and calculates, for example, the Euclidean distance between the images, thereby acquiring a similarity. Setting of the determination target region is done while shifting the region on the pixel basis or on the ½ pixel basis in the determination past intermediate value map. The server CPU 201 finally specifies, as the position of the region having the highest correlation, the position of the region having the shortest Euclidean distance (highest similarity) to the reference image.

Note that when performing inter-frame coding in coding processing to be described later, the moving image distribution server 200 of this embodiment codes, using reference data acquired from the frame immediately before the current frame, the difference image between the current frame image and the reference data. For this reason, the description will be made assuming that the coding determination is also performed for the frame immediately before the current frame. However, the past frame referred to in inter-frame coding is not limited to the frame immediately before the current frame, and any frame before the current frame is usable.

In step S406, the server CPU 201 determines whether to perform intra-frame coding or inter-frame coding for each block of the determination intermediate value map (coding determination). More specifically, the server CPU 201 determines whether the similarity (for example, the reciprocal of the Euclidean distance) calculated for the region of the determination past intermediate value map with the highest correlation to each block is equal to or higher than a preset threshold. The server CPU 201 determines to perform inter-frame coding for a block whose similarity to the region having the highest correlation is equal to or higher than the threshold or perform intra-frame coding for a block having a similarity lower than the threshold.

In step S407, the server CPU 201 calculates a motion vector from the region of the determination past intermediate value map having the highest correlation for, out of the blocks of the determination past intermediate value map, each block determined to perform inter-frame coding. In association with specific information for specifying a block determined to perform inter-frame coding, the server CPU 201 transmits the information of the motion vector for the block to the server communication unit 208 and causes it to send the information to the PC 100 as preprocessing information.

On the other hand9, in processing parallel to the processing of steps S403 to S407, the server CPU 201 causes, in step S408, the server GPU 204 to execute rendering processing of the subsequent stage for the game screen corresponding to the viewpoint information updated in step S401, thereby generating the game screen (distribution game screen) to be finally provided to the PC 100. More specifically, the server CPU 201 specifies the light source to be applied to the three-dimensional scene of the rendered game screen and transmits the information of the attribute, intensity, and like of the light source to the server GPU 204. The server GPU 204 renders rendering objects included in the game screen again while performing shadow processing (applying light source effects) of various kinds of light sources at once using the various kinds of intermediate value maps generated in the rendering processing of the preceding stage, thereby generating the distribution game screen on the frame buffer of the server VRAM 205.

In step S409, the server CPU 201 determines whether the coding determination processing for the current frame in step S406 is completed. Upon determining that the coding determination processing is completed, the server CPU 201 advances the process to step S410. Upon determining that the coding determination processing is not completed, the processing of step S409 is repeated.

In step S410, the server CPU 201 divides the distribution game screen into blocks as in the block division of step S404 and executes coding processing to generate coded moving image data.

(Coding Processing)

Figure 6:
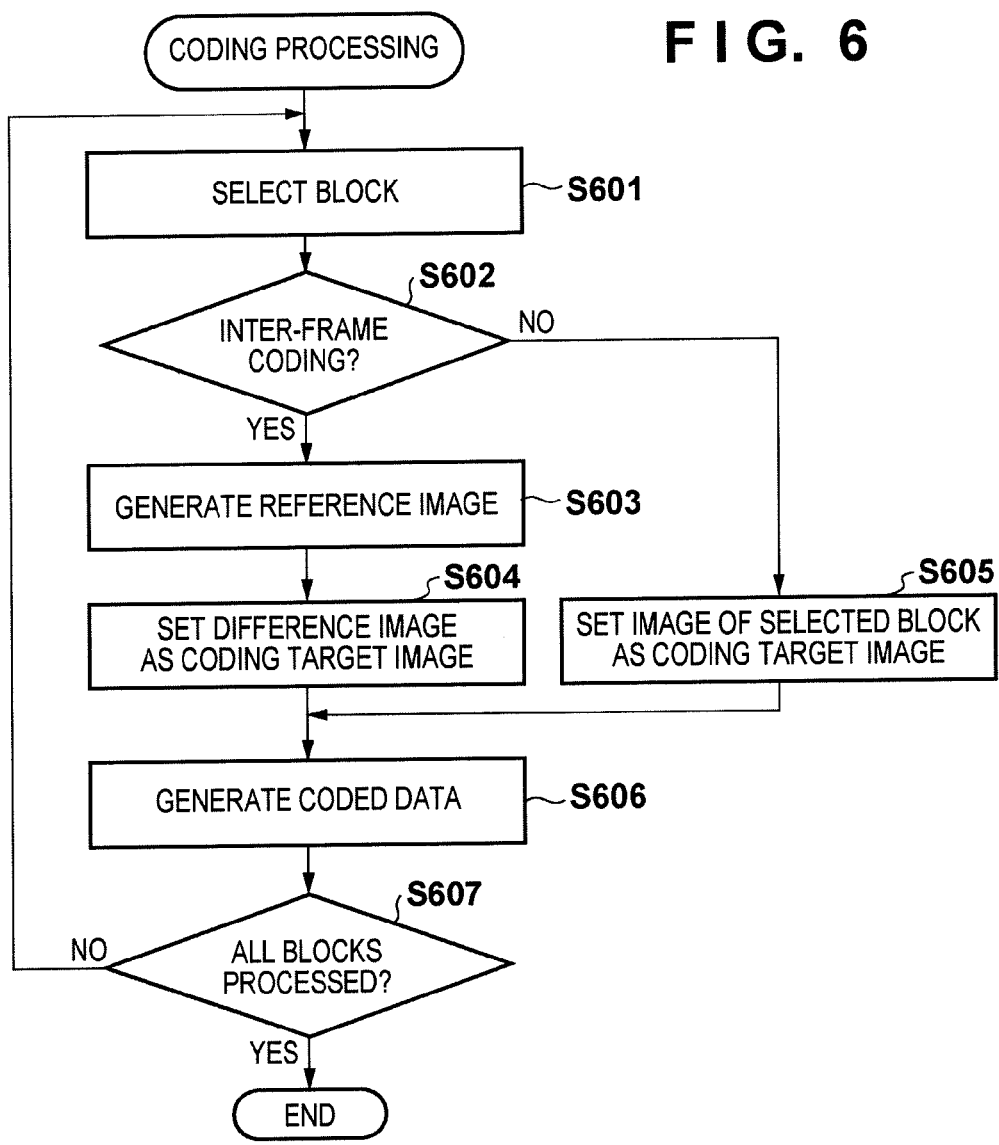
FIG. 6 is a flowchart illustrating coding processing of the moving image distribution server 200 according to the embodiment of the present invention.

Details of coding processing executed in the moving image distribution server 200 of the embodiment will be explained with reference to FIG. 6.

In step S601, the server CPU 201 selects an uncoded block out of the blocks of the distribution game screen.

In step S602, the server CPU 201 determines, by referring to the result of coding determination processing performed for the determination intermediate value map, whether to perform inter-frame coding for the selected block. Upon determining to perform inter-frame coding for the selected block, the server CPU 201 advances the process to step S603. Upon determining not to perform inter-frame coding, the server CPU 201 advances the process to step S605.

In step S603, the server CPU 201 generates a reference image (reference data) to be used for inter-frame coding from the image of the region, corresponding to the selected block, of the game screen (preceding game screen) rendered in the frame immediately before the current frame. More specifically, the server CPU 201 first reads out the game screen (past game screen) provided to the PC 100 in the preceding frame from, for example, the server RAM 203. The server CPU 201 extracts, from the past game screen as the reference image, the image of a region specified for the selected block in correspondence with the region having the highest correlation.

In step S604, the server CPU 201 generates the difference between the image of the selected block and the reference image as a difference image and sets it as a coding target image. More specifically, the server CPU 201 generates the difference image (pblock) by subtracting the pixel value of each pixel of the reference image from the pixel value of a corresponding pixel of the selected block.

On the other hand, if it is determined in step S602 not to perform inter-frame coding, the server CPU 201 sets the image of the selected block as the coding target image in step S605.

In step S606, the server CPU 201 transmits the coding target image to the server coding unit 206 and causes it to execute DCT processing to convert the image into data in the frequency domain. The server CPU 201 also causes the server coding unit 206 to perform run-length coding of the data in the frequency domain obtained by conversion, thereby generating the coded data of the selected block.

In step S607, the server CPU 201 determines whether all blocks of the rendered game screen have performed the processing of step S602 to S606. Upon determining that an unprocessed block exists, the server CPU 201 returns the process to step S601. Upon determining that no unprocessed block exists, the coding processing is completed.

After coded moving image data is generated from the rendered game screen, the server CPU 201 transmits the coded moving image data to the server communication unit 208 and causes it to send the data to the PC 100 in step S411, and completes the moving image distribution processing of the current frame.

As described above, using the fact that the game screen to be provided to the PC 100 is generated by multistage rendering processing, the moving image distribution server 200 according to this embodiment can determine the coding method for each block of a game screen during rendering processing of the subsequent stage for rendering the final game screen using the intermediate value maps generated by rendering processing of the preceding stage. Since coding processing can start without determining the coding method after the final game screen has been rendered, the time needed for providing the game screen to the PC 100 can be shortened.

<Moving Image Reproduction Processing>

Figure 7:
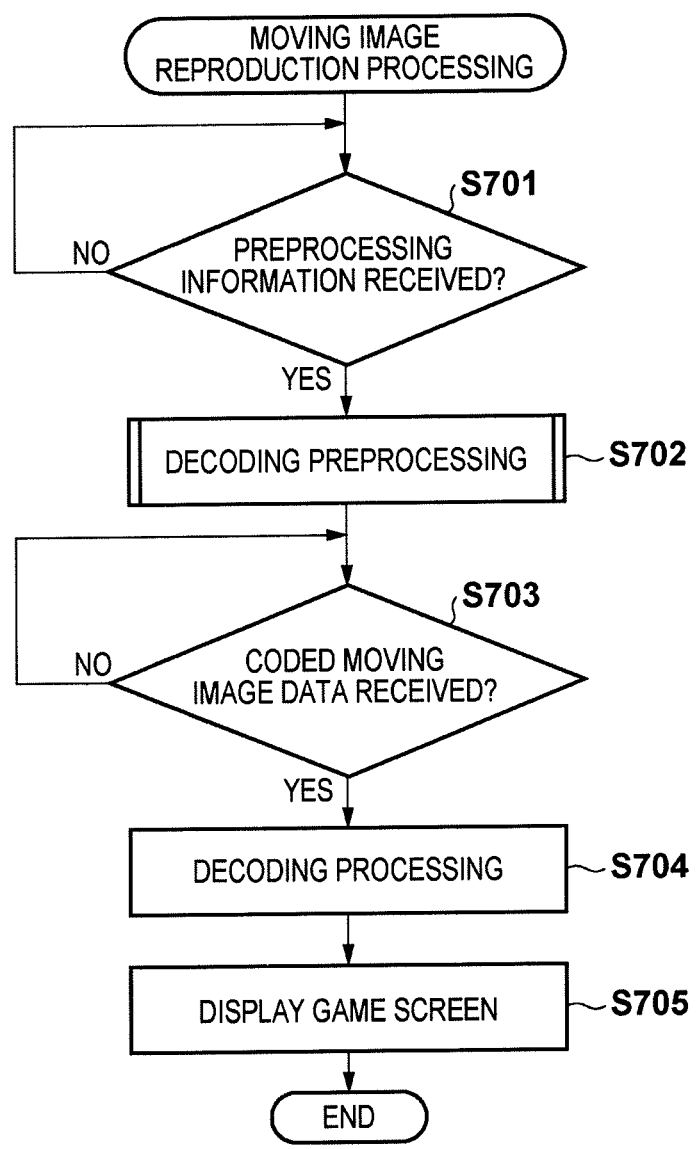
FIG. 7 is a flowchart illustrating moving image reproduction processing of the PC 100 according to the embodiment of the present invention.

Details of moving image reproduction processing to be executed by the PC 100 of the embodiment will be described with reference to the flowchart of FIG. 7. Processing corresponding to the flowchart can be implemented by causing the CPU 101 to read out a corresponding processing program recorded in, for example, the ROM 102 and extract and execute it on the RAM 103. Note that the description will be made assuming that the moving image reproduction processing is started when, for example, an application for receiving a game content provided by the moving image distribution server 200 is executed on the PC 100, and repetitively executed for each frame of the game.

In step S701, the CPU 101 determines whether the communication unit 105 has received preprocessing information from the moving image distribution server 200. Upon determining that preprocessing information has been received from the moving image distribution server 200, the CPU 101 advances the process to step S702. Upon determining that the information has not been received, the processing of step S701 is repeated.

In step S702, the CPU 101 executes decoding preprocessing of preparing reference data necessary for decoding the game screen of the current frame by referring to the preprocessing information.

(Decoding Preprocessing)

Details of decoding preprocessing to be executed by the PC 100 of the embodiment will be described with reference to the flowchart of FIG. 8.

In step S801, the CPU 101 selects, out of the blocks of the game screen received in the current frame, a block that has not performed coding type determination used.

In step S802, the CPU 101 determines, by referring to the preprocessing information, whether inter-frame coding has been done for the selected block. More specifically, the CPU 101 determines whether the preprocessing information includes information for specifying the selected block. Upon determining that inter-frame coding has been done for the selected block, the CPU 101 advances the process to step S803. Upon determining that inter-frame coding has not been done, the CPU 101 advances the process to step S804.

In step S803, the CPU 101 extracts a reference image (reference data) to be used for decoding the selected block from the game screen (preceding frame screen) decoded in the frame immediately before the current frame. More specifically, the CPU 101 specifies the region to be referred to decode the selected block in the preceding frame screen by referring to the motion vector associated with the selected block and included in the preprocessing information, and extracts the image of the region as the reference image.

In step S804, the CPU 101 determines whether all blocks of the game screen received in the current frame have performed the processing of steps S802 and S803. Upon determining that an unprocessed block exists, the CPU 101 returns the process to step S801. Upon determining that no unprocessed block exists, the decoding preprocessing is completed.

As described above, before decoding processing to be executed after reception of coded moving image data, the PC 100 of this embodiment can prepare reference data to be used in decoding processing by referring to the preprocessing information received before coded moving image data.

In step S703, the CPU 101 determines whether the communication unit 105 has received coded moving image data from the moving image distribution server 200. Upon determining that coded moving image data has been received from the moving image distribution server 200, the CPU 101 advances the process to step S704. Upon determining that no data has been received, the processing of step S703 is repeated.

In step S704, the CPU 101 transmits the received coded moving image data to the decoding unit 104 and causes it to execute decoding processing to generate the game screen. More specifically, the decoding unit 104 performs decoding of the run-length-coded data string and inverse DCT processing for each block of the coded moving image data, thereby generating the block data of the game screen of the current frame. For a block that has performed inter-frame coding, the decoding unit 104 adds the reference data generated by the above-described decoding preprocessing, thereby generating the game screen of the current frame.

In step S705, the CPU 101 transmits the game screen of the current frame generated in step S704 to the display unit 106, causes it to display the game screen in a corresponding display region, and completes the moving image reproduction processing of the current frame.

As described above, the moving image distribution server 200 in the moving image distribution system of this embodiment can transmit coding method information to the PC 100 before coded moving image data is generated and distributed. More specifically, since a reference image can be prepared by preprocessing before reception of the coded moving image data, the time of decoding processing executed after reception of the coded moving image data can be shortened. That is, the moving image distribution method of this embodiment can shorten the time needed until reproduction of a decoded moving image as compared to a conventional method in which a reference image to be used for decoding a block that has performed inter-frame coding is generated from the preceding frame image by referring to a motion vector contained in received coded moving image data.

Figure 9:
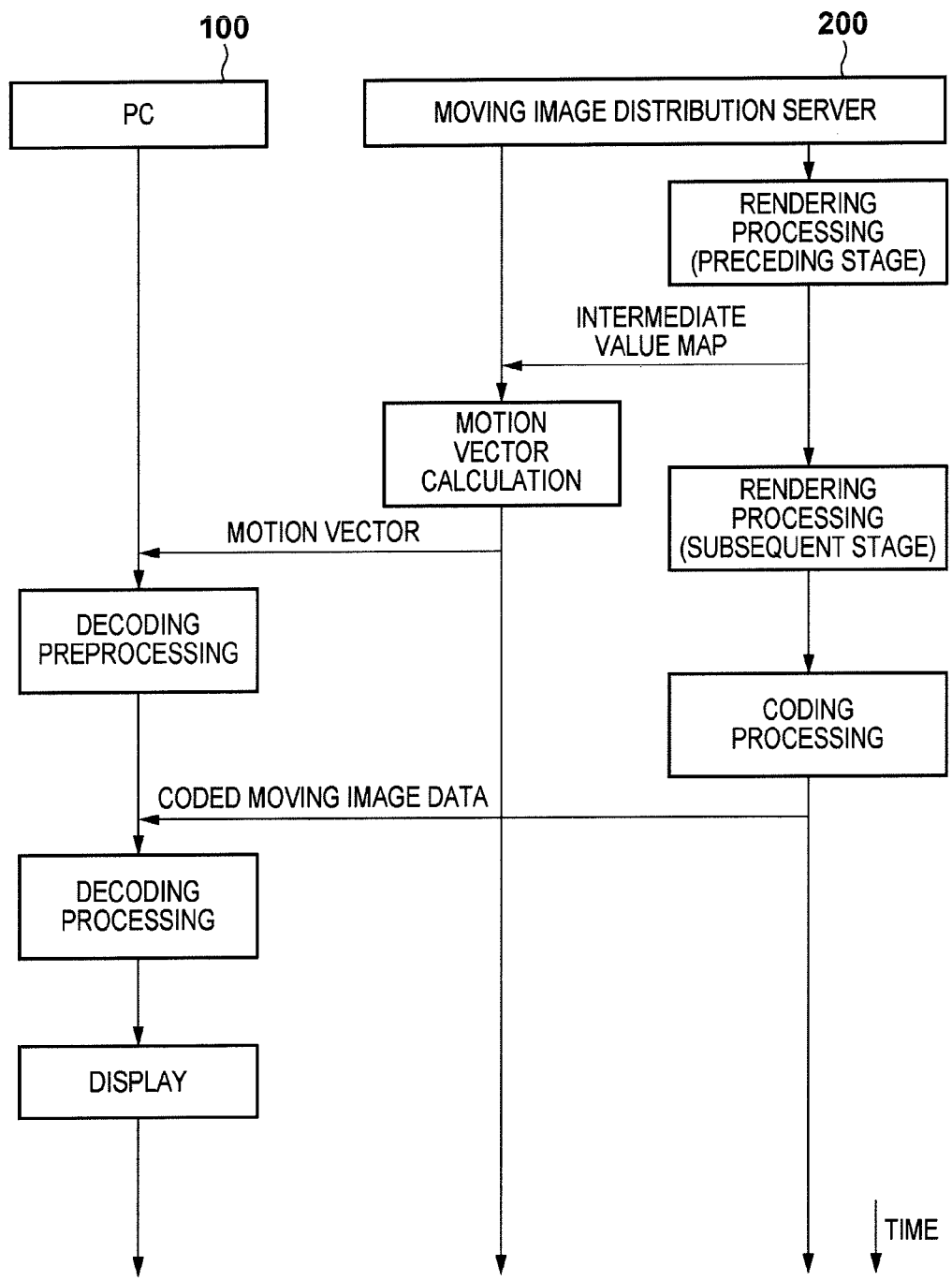
FIG. 9 is a flowchart illustrating overall processing of the moving image distribution system according to the embodiment of the present invention.

That is, the moving image distribution system uses the processing procedure as shown in FIG. 9 as a whole. Applying the present invention allows to implement both efficient moving image coding processing in the moving image distribution server 200 and efficient moving image decoding processing in the PC 100.

Note that the moving image distribution processing has been described above assuming that the preprocessing information is sent to the PC 100 after coding determination has been executed for all blocks of the screen of the current frame. However, the timing of preprocessing information sending is not limited to this, as can easily be anticipated. More specifically, each time a result is obtained by determining whether to perform inter-frame coding for each block, the server CPU 201 may send the preprocessing information of the block to the PC 100 instead of waiting for the determination results of all blocks. In this case, when the CPU 101 of the PC 100 receives preprocessing information and generates the reference image of a block specified by the preprocessing information, the moving image distribution processing can be expected to be more efficient.

In this embodiment, for a block determined to perform inter-frame coding out of the blocks of the determination intermediate value map, a region of the determination past intermediate value map, which has the highest correlation and includes as many pixels as the block, is searched for as reference data at the time of coding. The description has been made assuming that a motion vector (two-dimensional vector) representing the region is sent to the PC 100. However, the region serving as the reference data at the time of inter-frame coding need not always be a region including the same number of pixels. For example, if an image obtained by enlarging/reducing a partial region of the determination past intermediate value map has the highest correlation to the coding target block, the enlarged/reduced image may be used as the reference data. Alternatively, for example, if an image obtained by rotating or projecting (deforming) a partial region of the determination past intermediate value map has the highest correlation to the coding target block, the rotated or projected image may be used as the reference data. In this case, to specify the region of the preceding frame screen to be used as the reference data, for example, an enlargement/reduction parameter or a transformation matrix for rotation/projection may be sent to the PC 100 together with a three-dimensional motion vector or a two-dimensional motion vector. Note that the information for specifying the region of the preceding frame screen to be used as the reference data is not limited to this. Information of any other form capable of specifying the region, for example, information for directly designating the vertex coordinates of the region is also usable.

As described above, the moving image distribution server of this embodiment can quickly and efficiently perform moving image coding of a screen obtained by rendering processing. More specifically, the moving image distribution server renders the distribution screen by rendering processing in at least two steps using viewpoint information to determine the screen to be rendered. The rendering processing is performed such that the distribution screen is rendered in rendering processing of the subsequent stage by referring to the intermediate value map of a specific channel generated by rendering processing of the preceding stage. The moving image distribution server selects the intermediate value map of at least one channel during execution of rendering processing of the subsequent stage for the first screen, and determines for each set block whether to perform inter-frame coding by referring to a corresponding intermediate value map generated for the second screen rendered before the first screen. After rendering processing of the subsequent stage has ended for the first screen, the moving image distribution server performs coding in accordance with the determination result and sends the coded moving image data to an external device. The determination result is sent to the external device before generation of the coded moving image data of the first screen is completed.

[Modification]

The above embodiment has been described assuming that the region having the highest correlation to each coded block of a corresponding map is specified in the preceding frame by correlation calculation such as Euclidean distance calculation using at least one of the plurality of types of intermediate value maps generated by rendering processing of the preceding stage. In general, the calculation amount is large in the processing of specifying the region having the highest correlation because the correlation calculation is executed as a brute-force search while changing the calculation target region. That is, since the server CPU 201 is required to have a calculation capability to complete the correlation calculation of all coded blocks during rendering processing of the subsequent stage, the introduction cost of the moving image distribution server 200 may increase. In this modification, a method of estimating the region having the highest correlation and calculating the correlation level of the region without performing correlation calculation for all coded blocks as a brute-force search will be described.

<Moving Image Distribution Processing>

Figure 10:
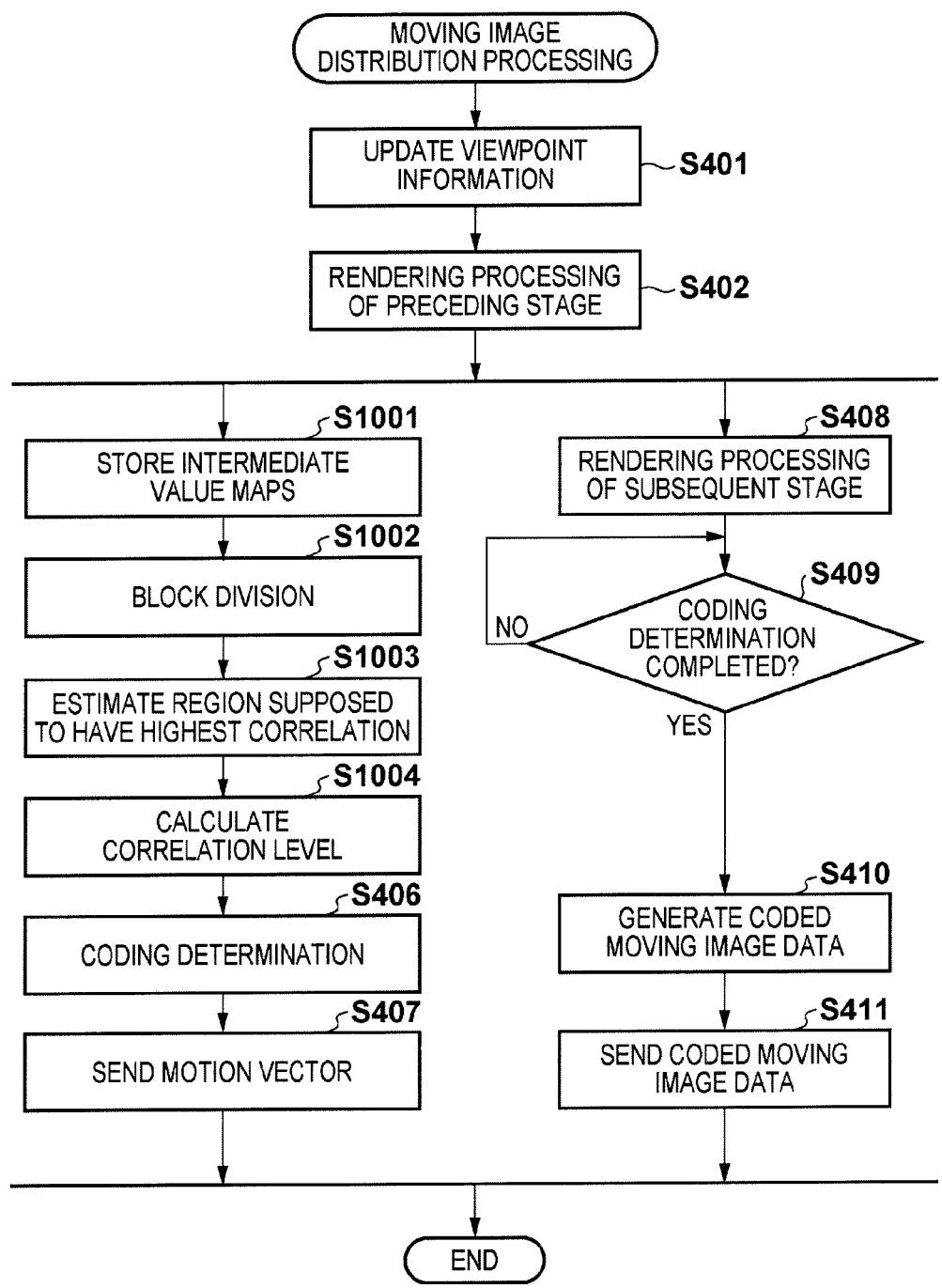
FIG. 10 is a flowchart illustrating moving image distribution processing of the moving image distribution server 200 according to a modification of the present invention.

Detailed moving image distribution processing to be executed by the moving image distribution server 200 according to the modification having the same arrangement as described above will be described with reference to the flowchart of FIG. 10. Note that in the moving image distribution processing of this modification, the same step numbers denote the steps for performing the same processes as in the moving image distribution processing of the above-described embodiment, and a description thereof will be omitted. Only steps for performing characteristic processes of the modification will be explained below.

After rendering processing of the preceding stage is completed in step S402, in step S1001 in one of the parallel processes, the server CPU 201 stores the generated intermediate value maps in the server RAM 203 in association with the viewpoint information (rendering viewpoint information) updated in step S401.

In step S1002, the server CPU 201 selects the Depth map as one of the plurality of types of intermediate value maps for coding determination, and divides the map into blocks.

In step S1003, the server CPU 201 estimates, for each block of the Depth map, a region supposed to have the highest correlation in the game screen of the preceding frame.

First, the server CPU 201 specifies the three-dimensional coordinate values of a rendering object (block specific object) that is rendered at the coordinates of the four corners of the target block. More specifically, the server CPU 201 acquires, from the depth buffer, the depth value at the coordinates of each of the four corners of the target blocks. Next, the server CPU 201 specifies the direction of the block specific object (direction toward the center of the block) based on the rendering viewpoint information and the coordinates of the four corners of the target block. The server CPU 201 specifies the three-dimensional coordinates of the block specific object based on the rendering viewpoint information, the specified direction to the block specific object, and the depth values.

The server CPU 201 then converts the three-dimensional coordinates of the block specific object into screen coordinates on the game screen of the preceding frame using the viewpoint information (past viewpoint information) used for rendering the game screen of the preceding frame. This enables to specify the coordinates of the four corners of the region supposed to have the highest correlation in the game screen of the preceding frame. That is, in this modification, a region where the same rendering object as in the target block is expressed, that is, a region having rendered contents with a high correlation at a high probability can be specified by inverse transformation to a three-dimensional scene, as shown in FIG. 11.

In step S1004, the server CPU 201 calculates the correlation level for the region estimated to have the highest correlation in step S1003. More specifically, the server CPU 201 reads out, from the server RAM 203, the Depth map (past Depth map) generated by rendering processing of the preceding stage for the preceding frame. The server CPU 201 extracts the image of the region estimated to have the highest correlation from the past Depth map and multiplies the image by, for example, a transformation matrix generated from the past viewpoint information and rendering viewpoint information, thereby generating a reference image having as many pixels as the target block. The server CPU 201 calculates the correlation level between the reference image and the image of the target block and advances the process to step S406.

As described above, the moving image distribution server 200 of this modification can estimate the region supposed to have the highest correlation to the coded block by coordinate transformation using the Depth map generated by rendering processing of the preceding stage. For this reason, the region supposed to have the highest correlation need not be specified by calculating the correlation level as a brute-force search, and it is therefore possible to reduce the calculation amount of correlation calculation for all coded blocks during rendering processing of the subsequent stage.

The modification has been described above assuming that the screen coordinates on the game screen of the preceding frame are strictly specified for the rendering object rendered in the target block, and the image is deformed into an image having as many pixels as the target block, thereby determining the correlation level. However, the practice of the present invention is not limited to this. For example, the screen coordinates on the game screen of the preceding frame may be calculated for the rendering object rendered at the center of the target block. A region having as many pixels as the target block set on the coordinates serving as the center may be set as the region supposed to have the highest correlation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of U.S. Patent Provisional Application No. 61/524,460, filed Aug. 17, 2011, and Japanese Patent Application No. 2012-019239, filed Jan. 31, 2012, which are hereby incorporated by reference herein in their entirety.

The invention claimed is:

1. A moving image distribution server, comprising:
an acquirer configured to sequentially acquire viewpoint information to determine a screen to be rendered;
a renderer configured to render a distribution screen by rendering processing in at least two steps using the viewpoint information acquired by said acquirer, wherein said renderer generates, in rendering processing of a preceding stage, an intermediate value map of a specific channel to be referred to in rendering processing of a subsequent stage, and renders, in the rendering processing of the subsequent stage, the distribution screen by referring to the intermediate value map;
a divider configured to acquire an intermediate value map of at least one channel generated for a first screen and divide the intermediate value map into a plurality of blocks during execution of the rendering processing of the subsequent stage for the first screen;
a specifier configured to specify, for each of the plurality of blocks, a region corresponding to the block on the intermediate value map of the same channel generated for a second screen rendered before the first screen;
a coder configured to generate, after an end of the rendering processing of the subsequent stage for the first screen, coded moving image data by coding the first screen, wherein for a block, out of the plurality of blocks, whose similarity to the corresponding region specified by said specifier is not less than a threshold, said coder performs inter-frame coding between an image of the block of the first screen and an image of the corresponding region of the second screen, and for a block, out of the plurality of blocks, whose similarity to the corresponding region specified by said specifier is less than the threshold, said coder performs intra-frame coding of the image of the block of the first screen; and
a sender configured to send data to an external device, wherein said sender
sends, for the block whose similarity to the corresponding region is not less than the threshold, the block and specific information to specify the corresponding region for the block to the external device before said coder completes generation of the coded moving image data of each block of the first screen, and
sends the coded moving image data to the external device after said coder has completed generation of the coded moving image data of each block of the first screen.

2. The server according to claim 1, wherein the intermediate value map of the at least one channel is one of an Albedo map, a Depth map, a Specular map, and a Diffuse map.

3. The server according to claim 1, wherein said specifier specifies a region having a highest similarity in the second screen as the corresponding region for each of the plurality of blocks.

4. The server according to claim 2, wherein said specifier comprises:
a first calculator configured to calculate, for each of the plurality of blocks, three-dimensional coordinates of a rendering object rendered at a vertex of the block based on first viewpoint information used for rendering the first screen and a Depth map generated for the first screen; and
a transformer configured to transform, for each of the plurality of blocks, the three-dimensional coordinates calculated by said first calculator into screen coordinates on the second screen using second viewpoint information used for rendering the second screen, and specifying the corresponding region.

5. A control method of a moving image distribution server, the control method comprising:
causing an acquirer of the moving image distribution server to sequentially acquire viewpoint information to determine a screen to be rendered;
causing a renderer of the moving image distribution server to render a distribution screen by rendering processing in at least two steps using the viewpoint information, wherein the renderer generates, in rendering processing of a preceding stage, an intermediate value map of a specific channel to be referred to in rendering processing of a subsequent stage, and renders, in the rendering processing of the subsequent stage, the distribution screen by referring to the intermediate value map;

causing a divider of the moving image distribution server to acquire an intermediate value map of at least one channel generated for a first screen and divide the intermediate value map into a plurality of blocks during execution of the rendering processing of the subsequent stage for the first screen;

causing a specifier of the moving image distribution server to specify, for each of the plurality of blocks, a region corresponding to the block on the intermediate value map of the same channel generated for a second screen rendered before the first screen;

causing a coder of the moving image distribution server to generate, after an end of the rendering processing of the subsequent stage for the first screen, coded moving image data by coding the first screen, wherein for a block, out of the plurality of blocks, whose similarity to the corresponding region is not less than a threshold, the coder performs inter-frame coding between an image of the block of the first screen and an image of the corresponding region of the second screen, and for a block, out of the plurality of blocks, whose similarity to the corresponding region is less than the threshold, the coder performs intra-frame coding of the image of the block of the first screen; and causing a sender of the moving image distribution server to send data to an external device, wherein the sender sends, for the block whose similarity to the corresponding region is not less than the threshold, the block and specific information to specify the corresponding region for the block to the external device before generation of the coded moving image data of each block of the first screen is completed, and sends the coded moving image data to the external device after generation of the coded moving image data of each block of the first screen is completed.

6. A non-transitory computer-readable recording medium that records a program for causing a computer to function as a moving image distribution server, the moving image distribution server comprising:

an acquirer configured to sequentially acquire viewpoint information to determine a screen to be rendered;

a renderer configured to render a distribution screen by rendering processing in at least two steps using the viewpoint information acquired by said acquirer, wherein said renderer generates, in rendering processing of a preceding stage, an intermediate value map of a specific channel to be referred to in rendering processing of a subsequent stage, and renders, in the rendering processing of the subsequent stage, the distribution screen by referring to the intermediate value map;

a divider configured to acquire an intermediate value map of at least one channel generated for a first screen and divide the intermediate value map into a plurality of blocks during execution of the rendering processing of the subsequent stage for the first screen;

a specifier configured to specify, for each of the plurality of blocks, a region corresponding to the block on the intermediate value map of the same channel generated for a second screen rendered before the first screen;

a coder configured to generate, after an end of the rendering processing of the subsequent stage for the first screen, coded moving image data by coding the first screen, wherein for a block, out of the plurality of blocks, whose similarity to the corresponding region specified by said specifier is not less than a threshold, said coder performs inter-frame coding between an image of the block of the first screen and an image of the corresponding region of the second screen, and for a block, out of the plurality of blocks, whose similarity to the corresponding region specified by said specifier is less than the threshold, said coder performs intra-frame coding of the image of the block of the first screen; and a sender configured to send data to an external device, wherein said sender sends, for the block whose similarity to the corresponding region is not less than the threshold, the block and specific information to specify the corresponding region for the block to the external device before said coder completes generation of the coded moving image data of each block of the first screen, and sends the coded moving image data to the external device after said coder has completed generation of the coded moving image data of each block of the first screen.

* * * * *